US010054051B2

(12) United States Patent
Foutch et al.

(10) Patent No.: US 10,054,051 B2
(45) Date of Patent: Aug. 21, 2018

(54) BLEED AIR SYSTEMS FOR USE WITH AIRCRAFT AND RELATED METHODS

(71) Applicant: The Boeing Company, Chicago, IL (US)

(72) Inventors: David W. Foutch, Seattle, WA (US); Steve G. Mackin, Bellevue, WA (US); Michael D. Bowman, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 849 days.

(21) Appl. No.: 14/242,493

(22) Filed: Apr. 1, 2014

(65) Prior Publication Data
US 2015/0275758 A1    Oct. 1, 2015

(51) Int. Cl.
*F02C 6/08* (2006.01)
*F02C 7/047* (2006.01)
(Continued)

(52) U.S. Cl.
CPC .............. *F02C 7/047* (2013.01); *F02C 6/08* (2013.01); *F02C 7/141* (2013.01); *F02C 7/32* (2013.01);
(Continued)

(58) Field of Classification Search
CPC ...... F02C 3/10; F02C 3/34; F02C 6/04; F02C 6/06; F02C 6/08; F02C 7/26; F02C 7/268; F02C 7/27; F02C 7/32; F02C 7/36; F02C 9/18; F02C 7/141; F02C 7/185; B64D 2013/0603; B64D 2013/0607; B64D 2013/0618; B64D 2013/0648; B64D 2013/0696
See application file for complete search history.

(56) References Cited

U.S. PATENT DOCUMENTS 2,800,002 A   7/1957  Seed
4,015,438 A   4/1977  Kinsell et al.
(Continued)

FOREIGN PATENT DOCUMENTS

CA    2773229      5/2011
CN    102596719    7/2012
(Continued)

OTHER PUBLICATIONS

Extended European Search Report, issued by the European Patent Office in connection with European Patent Application No. 14175279.0 dated Dec. 3, 2014, 9 pages.
(Continued)

*Primary Examiner* — Gerald L Sung
*Assistant Examiner* — Marc Amar
(74) *Attorney, Agent, or Firm* — Hanley, Flight & Zimmerman, LLC

(57) ABSTRACT

Bleed air systems for use with aircraft and related methods are disclosed. An example apparatus includes a compressor having a compressor inlet and a compressor outlet. The compressor is to be driven by a drive shaft extending from an engine of an aircraft. The example apparatus also includes a first passageway to fluidly couple a first low-pressure bleed air port from the engine to the compressor inlet and a second passageway to fluidly couple the compressor outlet to a system of the aircraft.

21 Claims, 7 Drawing Sheets

(51) Int. Cl.
  *F02K 3/02* (2006.01)
  *F02C 7/32* (2006.01)
  *F02C 7/36* (2006.01)
  *F02C 9/18* (2006.01)
  *F02C 7/141* (2006.01)
  *B64D 13/06* (2006.01)

(52) U.S. Cl.
  CPC ................. *F02C 7/36* (2013.01); *F02C 9/18* (2013.01); *F02K 3/02* (2013.01); *B64D 2013/0603* (2013.01); *B64D 2013/0607* (2013.01); *Y02T 50/671* (2013.01)

(56) References Cited

U.S. PATENT DOCUMENTS

| | | | |
|---|---|---|---|
| 4,262,495 A | 4/1981 | Gupta et al. | |
| 4,487,034 A | 12/1984 | Cronin et al. | |
| 4,503,666 A * | 3/1985 | Christoff | B64D 13/06 60/39.183 |
| 4,684,081 A | 8/1987 | Cronin | |
| 5,036,678 A | 8/1991 | Renninger et al. | |
| 5,063,963 A * | 11/1991 | Smith | F02C 6/08 137/606 |
| 5,114,100 A | 5/1992 | Rudolph et al. | |
| 5,136,837 A * | 8/1992 | Davison | F02C 6/08 60/39.183 |
| 5,143,329 A * | 9/1992 | Coffinberry | F02C 7/277 244/118.5 |
| 5,363,641 A * | 11/1994 | Dixon | F02C 6/08 60/226.1 |
| 5,414,992 A * | 5/1995 | Glickstein | B64D 13/006 60/39.83 |
| 5,524,848 A | 6/1996 | Ellsworth | |
| 5,813,630 A | 9/1998 | Williams | |
| 5,899,805 A | 5/1999 | Dowd et al. | |
| 5,967,461 A * | 10/1999 | Farrington | B64D 13/06 244/118.5 |
| 6,189,324 B1 * | 2/2001 | Williams | B64D 13/06 62/172 |
| 6,305,156 B1 * | 10/2001 | Lui | B64D 13/06 454/76 |
| 6,401,473 B1 | 6/2002 | Ng et al. | |
| 6,415,595 B1 * | 7/2002 | Wilmot, Jr. | B64D 13/006 60/266 |
| 6,491,254 B1 | 12/2002 | Walkinshaw et al. | |
| 6,526,775 B1 | 3/2003 | Asfia et al. | |
| 6,629,428 B1 * | 10/2003 | Murry | B64D 13/06 62/401 |
| 6,681,592 B1 | 1/2004 | Lents et al. | |
| 6,688,558 B2 | 2/2004 | Breer et al. | |
| 6,709,246 B2 | 3/2004 | Boyd | |
| 6,796,131 B2 | 9/2004 | Sampson | |
| 6,942,183 B2 | 9/2005 | Zywiak | |
| 6,971,241 B2 * | 12/2005 | Critchley | F02C 6/00 60/776 |
| 6,997,013 B2 | 2/2006 | Jones | |
| 7,207,521 B2 | 4/2007 | Atkey et al. | |
| 7,246,482 B2 * | 7/2007 | Mahoney | F02C 3/13 60/204 |
| 7,467,524 B2 | 12/2008 | Brutscher et al. | |
| 7,607,318 B2 | 10/2009 | Lui et al. | |
| 7,618,008 B2 | 11/2009 | Scherer et al. | |
| 7,727,057 B2 | 6/2010 | Beier et al. | |
| 7,871,038 B2 | 1/2011 | Space et al. | |
| 8,047,470 B2 | 11/2011 | Porte | |
| 8,063,501 B2 * | 11/2011 | Finney | F01D 15/10 290/52 |
| 8,529,189 B2 * | 9/2013 | Brown | F02C 6/08 415/1 |
| 8,769,962 B2 * | 7/2014 | Glahn | F01D 25/18 60/39.08 |
| 8,955,794 B2 * | 2/2015 | Mackin | F02C 6/08 244/134 R |
| 9,163,562 B2 | 10/2015 | Suciu et al. | |
| 9,416,677 B2 * | 8/2016 | Munsell | F01D 15/12 |
| 9,765,700 B2 * | 9/2017 | Mackin | F02C 6/04 |
| 9,835,050 B2 * | 12/2017 | Marche | F01D 25/12 |
| 9,879,610 B2 * | 1/2018 | Moes | F02C 9/18 |
| 2001/0032472 A1 | 10/2001 | Buchholz et al. | |
| 2003/0005718 A1 | 1/2003 | Mitani et al. | |
| 2003/0051492 A1 | 3/2003 | Hartenstein et al. | |
| 2003/0177781 A1 | 9/2003 | Haas et al. | |
| 2004/0172963 A1 | 9/2004 | Axe et al. | |
| 2005/0051668 A1 | 3/2005 | Atkey et al. | |
| 2006/0272313 A1 * | 12/2006 | Eick | F02C 3/107 60/39.63 |
| 2008/0314060 A1 | 12/2008 | Parikh | |
| 2009/0277445 A1 | 11/2009 | Markwart | |
| 2009/0314002 A1 * | 12/2009 | Libera | F02C 6/08 60/778 |
| 2010/0107594 A1 | 5/2010 | Coffinberry et al. | |
| 2010/0192593 A1 * | 8/2010 | Brown | F02C 6/08 60/782 |
| 2011/0107777 A1 | 5/2011 | Atkey et al. | |
| 2011/0236179 A1 | 9/2011 | Rog et al. | |
| 2012/0111022 A1 * | 5/2012 | Dyer | F02C 7/277 60/788 |
| 2012/0186267 A1 | 7/2012 | Coffinberry et al. | |
| 2013/0098059 A1 * | 4/2013 | Suciu | F02C 9/16 60/783 |
| 2013/0164115 A1 * | 6/2013 | Sennoun | F02C 7/185 415/1 |
| 2013/0187007 A1 * | 7/2013 | Mackin | F02C 6/08 244/134 R |
| 2013/0269374 A1 * | 10/2013 | Kelnhofer | B64D 13/06 62/89 |
| 2014/0196470 A1 * | 7/2014 | Glahn | F01D 11/04 60/785 |
| 2015/0121842 A1 | 5/2015 | Moes | |
| 2015/0233291 A1 * | 8/2015 | Pelagatti | F02C 6/08 60/782 |
| 2015/0275758 A1 * | 10/2015 | Foutch | F02C 7/047 60/779 |
| 2015/0275769 A1 * | 10/2015 | Foutch | F02C 9/18 60/776 |
| 2016/0369705 A1 * | 12/2016 | Mackin | F02C 6/08 |
| 2017/0268430 A1 * | 9/2017 | Schwarz | F02C 9/18 |
| 2017/0268431 A1 * | 9/2017 | Schwarz | B64D 13/06 |

FOREIGN PATENT DOCUMENTS

| | | |
|---|---|---|
| DE | 102006042584 | 3/2008 |
| EP | 2470425 | 7/2012 |
| JP | 2013510042 | 3/2013 |
| WO | 9920528 | 4/1999 |
| WO | 0037313 | 6/2000 |
| WO | 0123724 | 4/2001 |
| WO | 2007093389 | 8/2007 |
| WO | 2011056285 | 5/2011 |

OTHER PUBLICATIONS

Office Action, issued by the United States Patent and Trademark Office in connection with U.S. Appl. No. 12/614,441, dated Jul. 3, 2014, 24 pages.

Final Rejection, issued by the United States Patent and Trademark Office in connection with U.S. Appl. No. 12/614,441, dated Jan. 3, 2014, 22 pages.

Advisory Action, issued by the United States Patent and Trademark Office in connection with U.S. Appl. No. 12/614,441, dated May 22, 2014, 3 pages.

Notice of Allowance and Fee(s) Due, issued by the United States Patent and Trademark Office in connection with U.S. Appl. No. 12/614,441, dated Dec. 5, 2014, 7 pages.

Notice of Allowance and Fee(s) Due, issued by the United States Patent and Trademark Office in connection with U.S. Appl. No. 13/357,293, dated Sep. 30, 2014, 8 pages.

(56) References Cited

OTHER PUBLICATIONS

Notice of Allowance and Fee(s) Due, issued by the United States Patent and Trademark Office in connection with U.S. Appl. No. 13/951,181, dated Sep. 30, 2014, 14 pages.
Communication Pursuant to Article 94(3) EPC, issued by the European Patent Office in connection with European Patent Application 13152433.2, dated Oct. 28, 2015, 4 pages.
Office Action, issued by the United States Patent and Trademark Office in connection with U.S. Appl. No. 13/951,181, dated Apr. 16, 2014, 9 pages.
14 C.F.R. Part 25.831 effective as of Jan. 21, 1997, last retrieved from http://www.airweb.faa.gov/Regulatory_and_Guidance_Library%5CrgFAR.nsf/0/E84799D57F7D41DF852566720051B01D?OpenDocument on Aug. 2, 2013, 3 pages.
International Searching Authority, "International Search Report," issued in connection with International Application No. PCT/US2010/047357, dated Dec. 3, 2010, 5 pages.
International Searching Authority, "Written Opinion of the International Searching Authority," issued in connection with International Application No. PCT/US2010/047357, dated Dec. 3, 2010, 5 pages.
The United States Patent and Trademark Office, "Office Action," issued in connection with U.S. Appl. No. 12/614,441, dated Apr. 26, 2013, 21 pages.
International Bureau, "International Preliminary Report on Patentability," issued in connection with International Application No. PCT/US2010/047357, dated May 8, 2012, 6 pages.
European Patent Office, "Communication Under Rule 71(3) EPC," issued in connection with European Application No. 10 750 0141-1753, dated Jun. 28, 2013, 5 pages.
The United States Patent and Trademark Office, "Requirement for Restriction/Election," issued in connection with U.S. Appl. No. 13/357,293, dated Sep. 25, 2013, 5 pages.
The United States Patent and Trademark Office, "Non-Final Office Action," issued in connection with U.S. Appl. No. 13/357,293, dated Feb. 7, 2014, 21 pages.
United States Patent and Trademark Office, "Non-Final Office Action," issued in connection with U.S. Appl. No. 14/632,322, dated Aug. 12, 2016, 21 pages.
United States Patent and Trademark Office, "Restriction and/or Election Requirement," issued in connection with U.S. Appl. No. 14/242,570, dated Nov. 2, 2016, 10 pages.
United States Patent and Trademark Office, "Notice of Allowance and Fee(s) Due," issued in connection with U.S. Appl. No. 14/242,570, dated Jun. 28, 2017, 38 pages.
United States Patent and Trademark Office, "Notice of Allowance and Fee(s) Due," issued in connection with U.S. Appl. No. 14/632,322, dated Apr. 17, 2017, 17 pages.
United States Patent and Trademark Office, "Non-Final Office Action," issued in connection with U.S. Appl. No. 14/242,570, dated Dec. 16, 2016, 23 pages.
United States Patent and Trademark Office, "Non-Final Office Action," issued in connection with U.S. Appl. No. 14/744,398, dated Jan. 26, 2018, 15 pages.

* cited by examiner

BLEED AIR SYSTEMS FOR USE WITH AIRCRAFT AND RELATED METHODS

FIELD

The present disclosure relates generally to aircraft and, more particularly, to bleed air systems for use with aircraft and related methods.

BACKGROUND

Commercial aircraft typically employ an environmental control system to pressurize a passenger cabin of the aircraft and/or thermal anti-icing systems to provide heated air for anti-icing applications. Air supply to these systems is typically provided by bleed air extracted from a compressor of an aircraft engine. To meet pressure and/or temperature demands of the various aircraft systems, bleed air is often extracted from a higher stage of the compressor that provides bleed air having a pressure and/or temperature above that demanded by the various systems. For example, bleed air is often extracted from a mid-stage of a high pressure compressor of an aircraft engine. The pressurized bleed air is often cooled, via a precooler, and reduced in pressure, via a pressure regulating valve, prior to providing the bleed air to a system (e.g., an environmental control system) of the aircraft. Thus, much of the energy spent by the engine to produce the bleed air is wasted when cooling the bleed air via the precooler and reducing the pressure of the bleed air. Extracting high-pressure bleed air from the mid-stage of the high pressure compressor of the aircraft engine may reduce the efficiency of the engine.

Some known piston engines provide pressurized air for the cabin environmental control system with a shaft-driven compressor, typically known as a supercharger. Known shaft-driven superchargers typically receive ambient air from an atmospheric inlet. Such shaft-driven superchargers pressurize the ambient air prior to supplying the various aircraft systems. However, the atmospheric inlet of such a supercharger produces drag. Additionally, the atmospheric inlet is often susceptible to icing and, thus, typically requires an anti-icing system that increases costs and system complexity. Further, known shaft-driven superchargers may have to be relatively large to produce a pressure change sufficient to power the systems of an aircraft. Other known systems employ a turbo-compressor. However, similar to the shaft-driven supercharger mentioned above, these known turbo-compressors also pressurize ambient air and, thus, suffer from the above-identified drawbacks.

SUMMARY

An example apparatus includes a compressor having a compressor inlet and a compressor outlet. The compressor is to be driven by a drive shaft extending from an engine of an aircraft. The example apparatus also includes a first passageway to fluidly couple a first low-pressure bleed air port from the engine to the compressor inlet and a second passageway to fluidly couple the compressor outlet to a system of the aircraft.

Another example apparatus includes a compressor operatively coupled to a drive shaft of an engine of an aircraft. The compressor includes an inlet fluidly coupled to a first bleed air port of the engine and an outlet fluidly coupled to a system of the aircraft. The compressor is to provide bleed air to the system when the aircraft is operating in a first condition. The example apparatus also includes a bleed air system to fluidly couple a second bleed air port of the engine to the system of the aircraft. The bleed air system is to provide bleed air to the system when the aircraft is operating in a second condition.

An example method includes coupling a compressor to a drive shaft of an aircraft engine, fluidly coupling a compressor inlet of the compressor to a first low-pressure bleed air source provided by a low-pressure compressor of the engine and fluidly coupling a compressor outlet of the compressor to a system of the aircraft that receives bleed air supply.

The features, functions and advantages that have been discussed can be achieved independently in various embodiments or may be combined in yet other embodiments further details of which can be seen with reference to the following description and drawings.

Figure 1:
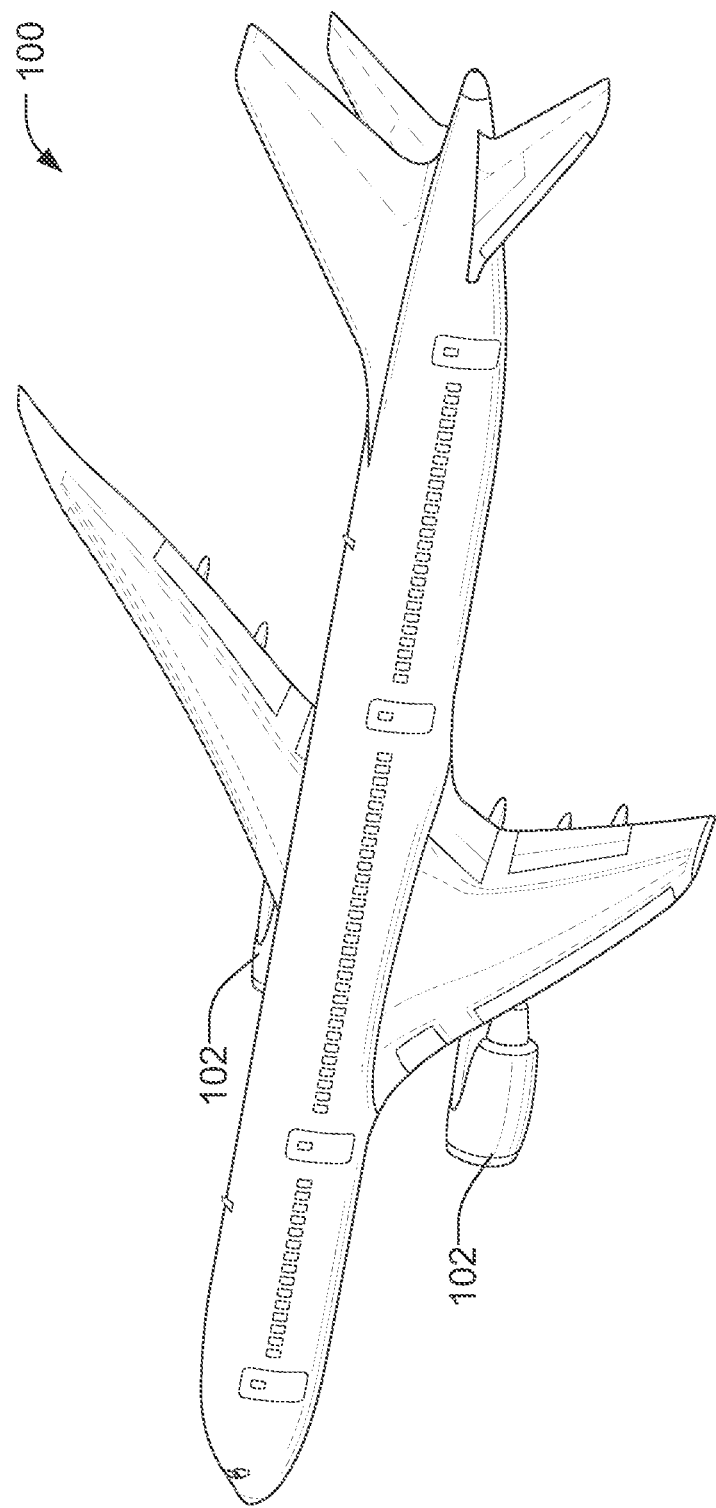
FIG. 1 is an illustration of an example aircraft that may embody the examples described herein.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Engine bleed air is typically provided by a compressor of an aircraft engine to power various systems of the aircraft. For example, bleed air is often used to power an environmental control system (ECS) and/or a thermal anti-icing system of the aircraft. The bleed air is bled from a compressor of the aircraft engine via a bleed port in a housing of the compressor. However, bleed air pressures vary greatly with operating conditions such as, for example, engine speed, operating altitude, etc.

To ensure the bleed air has sufficient pressure and/or temperature to power various systems of the aircraft, the bleed air is often extracted from a bleed port (e.g., a low-pressure bleed port) of a compressor that provides sufficient pressure for the systems. Additionally, bleed air may also be provided via a high-pressure bleed port when the pressure of the low-pressure bleed air is insufficient to supply the systems. For example, bleed air is often extracted from a mid or intermediate stage (e.g., a fifth stage) of a high pressure compressor of an aircraft engine during high engine speeds and from a discharge or final stage (e.g., a tenth stage) of the high pressure compressor during high altitude and/or low engine speed operations. Much of the energy spent by the engine to produce the bleed air may be wasted if not completely used.

The bleed air extracted from the engine often exceeds a temperature threshold of the aircraft systems utilizing the bleed air. Thus, the bleed air is cooled prior to supplying the bleed air to, for example, the ECS. To reduce the bleed air temperature, commercial aircraft typically employ a heat exchanger (e.g., a precooler) through which bleed air passes and which is typically located on a pylon adjacent to the engine. A fan operated by the engine of the aircraft provides cool air to the precooler to cool the bleed air prior to supplying the bleed air to the systems of the aircraft. The fan air often is dumped overboard after flowing through the precooler. Thus, cooling the bleed air via the fan reduces the efficiency of the aircraft engine. Additionally, the precooler typically has a relatively large dimensional envelope, which adds extra weight and may require a fan air scoop and exhaust that produce drag. Thus, the relatively large dimensional envelope of the precooler can also affect the efficiency of the aircraft engine.

Additionally, the bleed air extracted from the engine often exceeds a pressure threshold of the aircraft systems utilizing the bleed air. Thus, the pressure of the bleed air is reduced prior to supplying the bleed air to, for example, the ECS. To reduce the bleed air pressure, commercial aircraft typically employ one or more pressure regulating valves through which bleed air passes. Thus, a substantial amount of the energy spent by the engine to produce the bleed air is wasted when cooling the bleed air and/or reducing the pressure of the bleed air. This wasted energy results in greater fuel consumption.

In some known examples, compressed air is provided to the various systems of the aircraft via electrically driven compressors. However, electrically driven compressors may not be efficient for relatively smaller aircraft. In other known examples, a bleed air system employs a turbo-compressor or shaft-driven compressor that receives ambient air from an atmospheric inlet. However, the atmospheric inlet produces drag. Additionally, the atmospheric inlet is often susceptible to icing and, thus, may require an anti-icing system that increases costs and system complexity. Further, the turbo-compressor or shaft-driven compressor may have to be relatively large to produce a pressure change sufficient to power the systems of an aircraft.

Example bleed air systems and related methods disclosed herein employ a shaft-driven compressor system that compresses or pressurizes bleed air from a bleed air source of the engine to provide compressed or pressurized air to the various systems of an aircraft such as, for example, an ECS, a thermal anti-icing system (e.g., a wing and/or engine anti-icing system), a pneumatic supply system (to supply pneumatic devices), and/or any other system of the aircraft that requires use of compressed air. The example shaft-driven compressor systems disclosed herein include a shaft-driven compressor that is operatively coupled to a drive shaft (e.g., a radial drive shaft) of the aircraft engine. The example shaft-driven compressor systems extract or divert bleed air from one or more relatively lower pressure bleed air ports of the aircraft engine and pressurize the bleed air to meet (e.g., but not exceed) the demand(s) of the systems of the aircraft. As a result, less energy is used by the bleed air systems during a significant number of flight conditions. Thus, the example bleed air systems disclosed herein do not waste the energy of the engine bleed air and thereby improve the efficiency of the engine, even when considering or taking into account the power used to operate the shaft-driven compressor.

Further, unlike known systems that employ a turbo-compressor or shaft-driven compressor that pressurizes ambient air, the example shaft-driven compressor systems described herein utilize compressed bleed air from one or more bleed air ports of the aircraft engine, thus drawing less power from the aircraft engine to operate the shaft-driven compressor. In other words, the example shaft-driven compressor systems increase the pressure of bleed air that has already been at least partially compressed or pressurized by the compressor(s) of the engine and, thus, less energy is used by the shaft-driven compressor to boost the bleed air to the pressure demanded by the systems of the aircraft.

In some example bleed air systems and related methods disclosed herein the shaft-driven compressor system is used in combination with a two-port or single-port bleed air system. The two-port or single-port bleed air system may be used to supplement the shaft-driven compressor system and provide compressed or pressurized air to the various aircraft systems during certain operating conditions. Additionally, the two-port or single-port bleed air system provides redundancy within the entire example bleed air system of the aircraft. In other words, if the shaft-driven compressor system is inoperable, the two-port or single-port bleed air system is capable of providing bleed air to the systems of the aircraft.

Additionally, employing the shaft-driven compressor systems disclosed herein significantly reduces an amount of high-pressure bleed air (or bleed air having relatively higher pressure) that may be needed to satisfy the demand of an aircraft environmental control system. More specifically, the example shaft-driven compressor systems provide compressed or pressurized air from a relatively low-pressure bleed air port source having a relatively lower pressure and/or temperature to power the systems of the aircraft. For example, some example bleed air systems and related methods disclosed herein employ a shaft-driven compressor system (e.g., with a manifold) that extracts bleed air from a first low-pressure bleed port (e.g., at the entrance of a high pressure compressor) and/or a second low-pressure bleed port (e.g., at a fifth or mid-stage of the high pressure compressor). Depending on the operating condition of the aircraft engine and/or the demand of the systems of the aircraft, the example shaft-driven compressor system may extract air from either port to more efficiently utilize the bleed air from the aircraft engine. Additionally, by extracting bleed air having relatively lower pressure (below that demanded the systems of the aircraft) and increasing the pressure of the bleed air via the shaft-driven compressor to just meet the demands of the systems, less energy in the bleed air is wasted (e.g., by use of a precooler or pressure regulating valve), which significantly reduces the specific fuel consumption of the engine.

Furthermore, the example bleed air systems and related methods disclosed herein may be combined with one or more of the bleed air systems disclosed in U.S. patent application Ser. No. 13/357,293, filed Jan. 24, 2012, entitled "BLEED AIR SYSTEMS FOR USE WITH AIRCRAFTS AND RELATED METHODS," U.S. application Ser. No. 13/951,181, filed Jul. 25, 2013, entitled "BLEED AIR SYSTEMS FOR USE WITH AIRCRAFTS AND RELATED METHODS," or U.S. patent application Ser. No. 14/242,570, filed Apr. 1, 2014, entitled "BLEED AIR SYSTEMS FOR USE WITH AIRCRAFT AND RELATED METHODS," all of which are incorporated herein by referenced in their entireties.

FIG. 1 illustrates an example commercial aircraft 100 having aircraft engines 102 (e.g., turbofan engines) that may embody aspects of the teachings of this disclosure. Each engine 102 of the aircraft 100 may employ a dedicated bleed air system and/or may employ a common bleed air system. In other words, in some examples, the aircraft 100 employs a dedicated bleed air system for each engine 102 and, in other examples, a common bleed air system is employed for all the engines. The bleed air system(s) provides compressed or pressurized air to an aircraft system such as, for example, an ECS and/or a thermal anti-icing system (e.g., an engine and/or wing anti-icing system).

Figure 2:
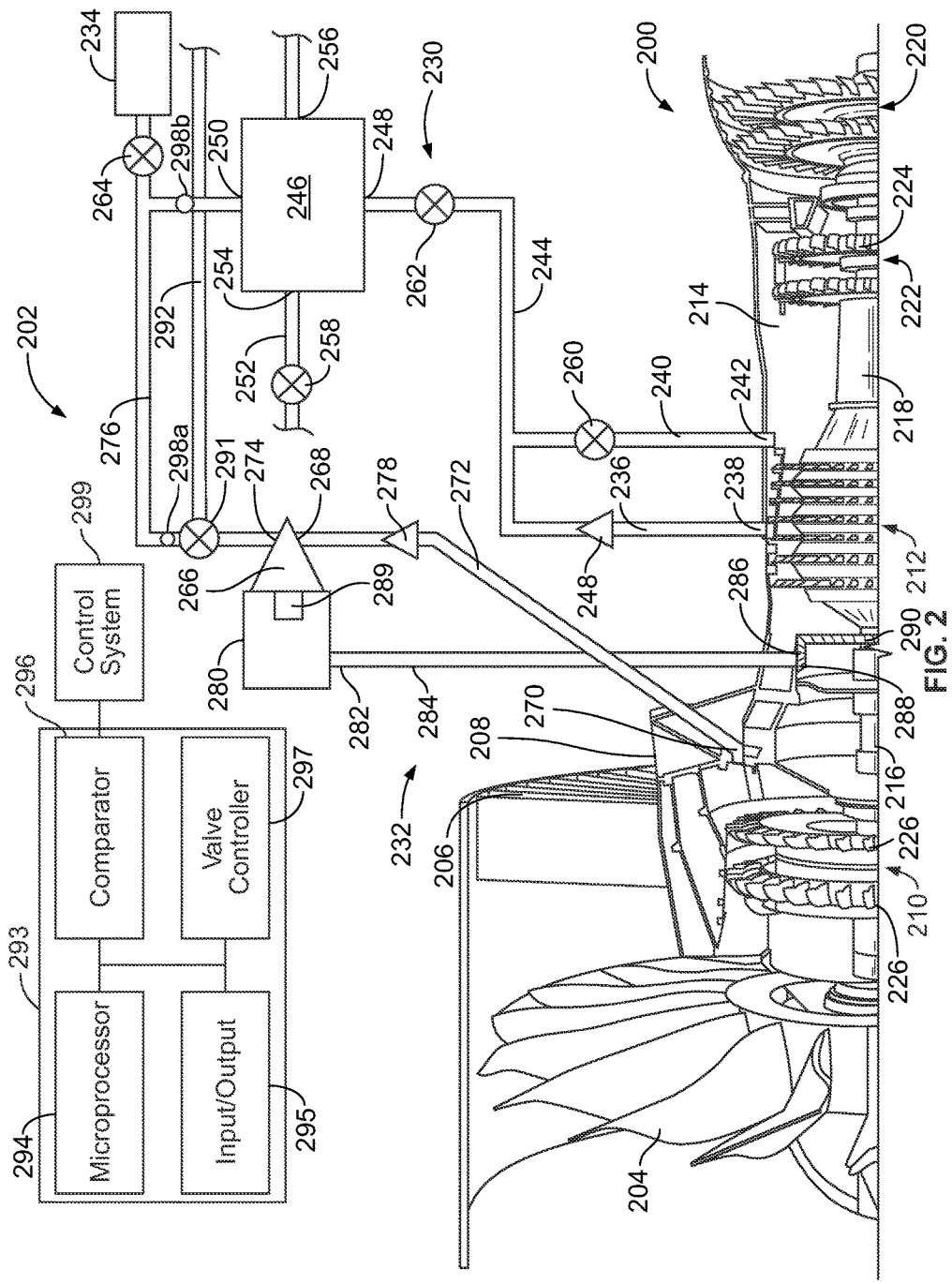
FIG. 2 illustrates an example aircraft engine having an example bleed air system disclosed herein.

FIG. 2 is a partial cutaway view of an engine 200 of an aircraft (e.g., the engine 102 of the aircraft 100) implemented with an example bleed air system 202 in accordance with the teachings of this disclosure. Referring to FIG. 2, the engine 200 is a gas turbine engine having a fan 204 that draws air into a fan duct or compressor intake section 206 and into a compressor 208. The compressor 208 may include multiple compressor sections. For example, as shown, the compressor 208 of the illustrated example is a dual-axial compressor 208 that includes two compressors, a first compressor 210 and a second compressor 212. Additionally, each of the first and second compressors 210, 212 includes various compressor stages that progressively increase the pressure of the air as the air flows from the fan duct section 206 to a combustion chamber 214. In the example shown, the first compressor 210 is a low-pressure compressor (LPC) that provides relatively low pressure air and the second compressor 212 is a high-pressure compressor (HPC) that provides relatively high pressure air. The compressors 210, 212 are operatively coupled to respective shafts 216, 218. The first shaft or LPC shaft 216 is operatively coupled to a low-pressure turbine 220 and the second shaft or HPC shaft 218 is operatively coupled to a high-pressure turbine 222. In this example, the compressor 208 is a dual-axial compressor that includes the two compressors 210, 212. However, in other examples, the compressor 208 may include more or fewer compressor sections, each having, for example, a turbine and respective shaft.

After exiting the HPC 212, the highly pressurized air is provided to the combustion chamber 214, where fuel is injected and mixed with the highly pressure air and ignited. The high energy airflow exiting the combustion chamber 214 turns blades 224 of the turbines 220, 222, which are coupled to respective ones of the shafts 216, 218. Rotation of the shafts 216, 218 turns blades 226 of the compressors 210, 212. The heated air is exhausted via a nozzle where it mixes with cool air, provided by the fan 204, that bypasses the engine core to produce forward thrust.

To supply various systems of an aircraft with pressurized air, the example bleed air system 202 includes a two-port bleed air system 230 and a shaft-driven compressor system 232. The example bleed air system 202 supplies engine bleed air to a system or control system 234 of the aircraft. The system 234 may include, for example, an ECS, a wing anti-icing system, an engine anti-icing system and/or any other system of an aircraft that utilizes compressed or pressured air. An ECS, for example, conditions the bleed air provided by the bleed air system 202 to a cabin pressure and/or cabin temperature. The ECS may include, for example, one or more ECS packs (e.g., an air cycle refrigeration system) that receive the bleed air from the bleed air system 202 and conditions or regulates the bleed air to cabin pressure and/or temperature.

In the illustrated example, the two-port bleed air system 230 includes a passageway or conduit 236 coupled to a first bleed port 238 (e.g., at an intermediate stage) of the HPC 212 and a passageway or conduit 240 coupled to a second bleed port 242 (e.g., at a discharge station) of the HPC 212. The second bleed port 242 is disposed downstream of the first bleed port 238. As a result, the pressure of the bleed air supplied by the second bleed port 242 is higher than the pressure of the bleed air supplied by the first bleed port 238. The passageways 236, 240 join together at a passageway or conduit 244 that is fluidly coupled to the system 234. Thus, the two-port bleed air system 230 may supply bleed air from either the first bleed air port 238 and/or the second bleed air port 242 to the system 234 of the aircraft.

In some examples, the temperature of the bleed air supplied by the first and second bleed air ports 238, 242 of the HPC 212 is greater than a threshold temperature of the system 234. Therefore, prior to the system 234 receiving the bleed air from one or both of the bleed air ports 238, 242, the bleed air flows through a heat exchanger or precooler 246 to reduce the temperature of the bleed air. Specifically, the bleed air in the passageway 244 flows between a precooler inlet 248 and a precooler outlet 250. To cool the bleed air, the precooler 246 receives air provided by the fan 204 via a passageway or conduit 252. The fan air flows through the precooler 246 between an inlet 254 and an outlet 256. The cooler fan air flowing between the inlet 254 and the outlet 256 reduces the temperature of the bleed air flowing between the precooler inlet 248 and the precooler outlet 250. To control the temperature of the bleed air at the precooler outlet 250, a flow control member or fan air modulating valve (FAMV) 258 is coupled to the passageway 252 and is disposed between the fan 204 and the inlet 254. The FAMV 258 varies the cooling fan airflow provided by the fan 204 and thereby controls the air temperature of the bleed air at the precooler outlet 250.

As shown in the illustrated example in FIG. 2, the system 234 can receive bleed air from either or both of the bleed air ports 238, 242. To prevent back flow pressure from entering the first bleed air port 238, the passageway 236 employs a flow control member or check valve 248 (e.g., a back-flow preventer, an intermediate port check valve (IPCV)). The check valve 248 is disposed between the first bleed port 238 of the HPC 212 and the junction of the passageways 236, 240 to prevent pressurized bleed air from flowing toward the first bleed port 238 when higher pressure bleed air is present in the passageway 244.

In some examples, the pressure of the bleed air supplied by the bleed air ports 238, 242 of the HPC 212 is greater than a demand or threshold pressure of the system 234. Therefore, prior to the system 234, one or more flow control members and/or shutoff valves are employed to regulate the pressure supplied to the system 234. As shown in the illustrated example of FIG. 2, a flow control member 260 is coupled to the passageway 240 and disposed between the second bleed port 242 of the HPC 212 and the junction of the passageways 236, 240. The flow control member 260 may be configured, for example, to regulate the pressure of the bleed air supplied by the second bleed port 242 to a pre-set or predetermined pressure value prior to supplying the bleed air to the system 234 and/or the flow control member 260 may provide fluid flow shut-off (e.g., a pressure-reducing valve (PRV), a pressured-reducing shut off valve (PRSOV), a shut off valve (SOV), a high pressure shut off valve (HPSOV)).

As shown in the illustrated example of FIG. 2, a flow control member 262 is coupled to the passageway 244 and is disposed between the junction of the passageways 236, 240 and the precooler inlet 248. The flow control member 262 may be configured, for example, to regulate the pressure of the bleed air to a pre-set or predetermined pressure value prior to the precooler 246 and/or provide fluid flow shut-off (e.g., a PRV, PRSOV, an SOV, a HPSOV).

In the example shown, a flow control member 264 is coupled to the passageway 244 and disposed prior to the system 234. For example, the flow control member 264 may be configured to regulate the pressure of the bleed air to a pre-set or predetermined pressure value prior to supplying the bleed air to the system 234 and/or the flow control member 264 may provide fluid flow shut-off (e.g., a PRV, PRSOV, an SOV, a HPSOV).

Depending on what condition in which the aircraft engine is operating (e.g., idle, take-off or climb, cruise, descent, etc.), the two-port bleed air system 230 may supply air to the system 234. For example, during cruise, bleed air may be diverted or extracted from the first bleed port 238 coupled to the HPC 212. In such an example, the flow control member 260 is closed to shut off flow of bleed air from the second bleed port 242 while the flow control member 262 and/or the flow control member 264 may be opened and set to supply pressurized bleed air to the system 234. However, in some examples, the pressure of the bleed air may be too high, so the flow control member 262 and/or the flow control member 264 may be set to reduce the pressure of the bleed air prior to the system 234. Additionally or alternatively, the temperature of this bleed air may be too high and the precooler 246 may be utilized to reduce the temperature of the bleed air to a temperature suitable for use in the system 234.

At relatively lower engine thrust settings (e.g., at idle, during descent), bleed air from the first bleed port 238 of the HPC 212 may not be high enough to meet the demands of the system 234. Therefore, in some examples, bleed air may be diverted or extracted from the second bleed port 242 of the HPC 212. In such an example, the flow control members 260, 262, 264 are opened to supply relatively higher pressure bleed air to the system 234. However, the pressure of the bleed air supplied by the second port 242 may be too high. Therefore, one or more of the flow control members 260, 262, 264 may be set to reduce the pressure the bleed air prior to the system 234. Additionally or alternatively, the temperature of the bleed air may be too high for use by the system 234. Therefore, the precooler 246 reduces the temperature of the bleed air.

However, in either scenario, the bleed air taken from the HPC 212 is often reduced in pressure and/or temperature and, thus, a substantial amount of the energy used by the engine 200 to produce the high-pressure/high-temperature bleed air is wasted. During cruise, which accounts for a majority of the flight time, the amount of wasted energy may be significant and result in a less efficient engine. Therefore, the example bleed air system 202 of the illustrated example employs a shaft-driven compressor system 232 to supply bleed air to the system 234 while reducing the amount of energy wasted by the two-port bleed air system 230.

In the illustrated example, the shaft-driven compressor system 232 includes a compressor 266 that receives compressed air (e.g., bleed air) that has been extracted or diverted from the LPC 210 (e.g., the final stage or discharge of the LPC 210). In particular, the compressor 266 of the illustrated example has a compressor inlet 268 fluidly coupled to a bleed port 270 of the LPC 210. A passageway or conduit 272 fluidly couples the bleed port 270 of the LPC 210 and the compressor inlet 268. The compressor 266 compresses the bleed air extracted from the LPC 210 to provide a relatively higher pressure bleed air at a compressor outlet 274, which is fluidly coupled to the system 234 of the aircraft. Specifically, a passageway or conduit 276 fluidly couples the compressor outlet 274 to the system 234. In the example shown, the example shaft-driven compressor system 232 operates by extracting lower-pressure bleed air from the bleed port 270 and compressing (e.g., boosting) the bleed air to a higher pressure to meet the demands of the system 234. Although in the illustrated example the compressor inlet 268 receives bleed air from a dedicated compressor stage (e.g., the discharge) of the LPC 210, the compressor inlet 268 may additionally or alternatively receive bleed air from another stage of the LPC 210 (e.g., a fourth stage, an eighth stage, etc.) and/or from another compressor stage of the HPC 212 (e.g., a second stage).

To prevent back flow pressure to the LPC 210, the shaft-driven compressor system 232 of the illustrated example employs a flow control member or check valve 278 (e.g., a back-flow preventer). The check valve 278 is disposed between the bleed port 270 of the LPC 210 and the compressor inlet 268 to prevent pressurized airflow toward the LPC 210 of the engine 200 when higher pressure bleed air is present in the passageway 272 downstream of the check valve 278. In other words, if the compressor 266 generates a back pressure at the compressor inlet 268 that is greater than the pressure of the bleed air extracted from the LPC 210, the check valve 278 prevents the back pressure from flowing into the LPC 210.

In the illustrated example, the compressor 266 is driven by the engine 200. More specifically, the compressor 266 is operatively coupled to a gearbox 280, which is operatively coupled to a first end 282 of a drive shaft 284 (e.g., a radial drive shaft). The drive shaft 284 rotates to provide power to the gearbox 280 and, thus, to the compressor 266. In the illustrated example, a second end 286 of the drive shaft 274 is operatively coupled to the engine 200. Specifically, the second end 286 of the drive shaft 284 is coupled to a first gear 288. The first gear 288 is engaged with a second gear 290 that is operatively coupled to the HPC drive shaft 218. In the example shown, the first and second gears 288, 290 are bevel gears and are oriented substantially perpendicular to each other. As the HPC drive shaft 218 rotates about its longitudinal axis, the second gear 290, which is engaged with the first gear 288, rotates the first gear 288 and, thus, the drive shaft 284 about its longitudinal axis. In some examples, the gearbox 290 is operatively coupled to one or more other systems used in the aircraft such as, for example, an electrical generator and/or a hydraulic pump. Additionally, although the second gear 290 is shown as operatively coupled to the HPC drive shaft 218 in the illustrated example, in other examples the second gear 290 may be operatively coupled to and driven by the LPC drive shaft 216 or any other drive shaft of the engine 200. In some examples, the compressor 266 and/or the gearbox 280 of example shaft-driven compressor system 232 are disposed within the nacelle of the engine 200. In some such examples, the gearbox 280 is coupled (e.g., mounted) to the fan case and the compressor 266 and the gearbox 280 are disposed within the fan compartment. In other such examples, the gearbox 280 is coupled to the core case of the engine 200 and the compressor 266 and gearbox 280 are disposed within the core compartment.

In the illustrated example, a constant gear ratio is employed between the HPC drive shaft 218 the compressor 266. The first and second gears 288, 290 may be sized to enable the compressor 266 to boost the bleed air extracted from the bleed air port 270 to a pressure demanded by the system 234. In some examples, the compressor 266 boosts the bleed air from the LPC 210 by a factor of 2.5, which meets the demands of the system 234. The compressor 266 may be, for example, a centrifugal compressor, an axial compressor or a mixed-flow compressor. In some examples, to account for varying inflow conditions (e.g., pressure fluctuations) and varying outflow demands, the compressor 266 includes variable geometry features such as inlet guide vanes and/or diffuser guide vanes to enable the compressor 266 to handle a range of variability in the inlet conditions and the outlet demands. More particularly, in some examples, the guide vanes may be adjusted to achieve a higher or a lower air flow and/or pressure at the compressor outlet 274. In other examples, a vane-less diffuser or system having a ported shroud may be employed to account for varying inflow conditions and outflow demands.

During cruise conditions, the shaft-driven compressor system 232 provides bleed air to the system 234 while minimizing waste of energy from the engine 200. Unlike known systems, in some examples, the shaft-driven compressor system 232 does not utilize a precooler or intercooler to reduce the temperature of the air (which wastes energy used to produce the relatively higher temperature bleed air). Instead, the shaft-driven compressor system 232 extracts bleed air from a source of lower pressure (which is relatively cooler) and uses the power from the drive shaft 284 to boost the pressure of the bleed to air to an appropriate amount for the system 234. Additionally, the first and second gears 288, 290 and/or the gearbox 280 may be configured to provide the appropriate amount of power and rotational speed to the compressor 266 to pressurize the bleed air to meet, but not exceed, the pressure demands of the system 234. As a result, the shaft-driven system 232 does not waste energy by reducing the pressure of the bleed air. In other examples, the shaft-driven compressor system 232 may employ a precooler to reduce the temperature of the bleed air.

During engine operating conditions other than cruise, such as during idle or descent, the bleed air provided at the compressor exit 274 may be too low to meet the demands of the system 234. In some examples, the compressor 266 is operatively coupled to the engine 200 via a fixed gear ratio, and if the engine 200 is operating at too low of an RPM, the compressor 266 may not be able to boost the bleed air from the LPC 210 to the desired pressure. Additionally or alternatively, during other operating conditions where a bleed air system from one engine is being used to supply bleed air to both engine bleed air systems (e.g., because the bleed air system of one engine is inoperable), the shaft-driven compressor may also not be able to supply a sufficient amount of bleed flow. In such instances, the two-port bleed air system 230 may be used in addition to or as an alternative to the shaft-driven compressor system 232 to provide higher pressure/temperature bleed air and/or additional bleed air to meet the demands of the system 234. Additionally, the two-port bleed air system 230 functions as a safety, or redundant system. In other words, if the shaft-drive compressor system 232 is inoperable, the two-port bleed air system 230 may still function to provide bleed air to the system 234.

In the illustrated example, a flow control member or dump valve 291 (e.g., a surge control valve, a three-way valve, a three-way pressure regulating valve) is coupled to the passageway 276 and is disposed between the compressor outlet 274 and the system 234. The flow control member 291 operates to prevent the compressor 266 from stalling or surging. In some examples, because the compressor 266 is operatively coupled to the engine 200 via a fixed gear ratio, the compressor 266 may be operating and compressing bleed air at all times while the engine is operating. In some examples, when the engine 200 is operating at relatively lower speeds, and the compressor 266 is not providing enough boost to the bleed air from the LPC 210, the two-port bleed air system 230 is employed to provide bleed air to the system 234 and the flow control member 291 is employed to direct the compressed bleed air from the compressor outlet 274 to another system in the engine 200 or of the aircraft. In the example shown, a passageway or conduit 292 fluidly couples the flow control member 291 to a downstream area. Similar to the air exiting the outlet 256 of the precooler 246, the bleed air dumped by the flow control member 291 may be directed onto the turbines 220, 222 and/or the casing of the engine to help cool the engine 200. Cooling the casing and/or the turbine blades, for example, maintains a proper clearance or spacing between the turbine blades and the casing (e.g., prevents shrinkage and/or expansion due to elevated temperatures). In other examples, the air exiting the outlet 256 of the precooler 246 and/or the air dumped by the flow control member 291 is dumped overboard in a manner to produce thrust (i.e., thrust recovery). In some examples, when the engine 200 is operating at relatively high speeds and the compressor 266 is producing greater airflow than that demanded by the system 234, the dump valve 291 may be employed to dump the excess air flow for one or more of the uses disclosed above. In other words, some or all of the air may be directed to the system 234 and/or the other locations disclosed above.

In some examples, a disconnect 289 (e.g., a quick disconnect) may be disposed between the compressor 266 and the gearbox 280 to disconnect the compressor 266 from the gearbox 280 and, thus, from the engine 200. In some examples where one or more of the check valves or flow control members of the shaft-driven compressor system is inoperable, the compressor 266 may be disconnected from the drive train in the gearbox 280 (e.g., by a technician). In such an instance, the compressor 266 would not be operable during flight and would not produce excess bleed air.

The bleed air system 202 may employ a control system 293 to operate the various flow control members 258, 260, 262, 264 and 291. The control system 293 of the illustrated example includes a microprocessor 294, an input/output module 295, a comparator 296, and a valve controller 297. For example, a sensor 298a downstream of the compressor outlet 274 may provide a signal (corresponding to a pressure of the bleed air prior to flowing to the system 234) to the microprocessor 294 via the input/output module 295. The control system 293 may determine if the downstream pressure measured by the sensor 298a is within a predetermined pressure range (e.g., a threshold pressure, a pressure demand) for a given altitude, aircraft speed, passenger count, icing condition or any other condition affecting the operation of the aircraft system 234. For example, the comparator 296 may compare the signal provided by the sensor 298a with a pressure threshold or range provided, for example, by a look-up table. For example, at cruise conditions, the flow control member 291 may be positioned or set so that the shaft-driven compressor system 232 may provide bleed air to the system 234. If the pressure falls outside of the range (e.g., below the threshold pressure), the control system 293 may cause the flow control member 291 to divert the bleed air from the compressor outlet 274 to another system (e.g., to the low-pressure turbine 220 to cool the low-pressure turbine). Additionally or alternatively, the control system 293 may also cause the flow control member 260 and/or the flow control member 262 to open and provide pressurized bleed air to the system 234 within the predetermined pressure range. Thus, in some examples, the control system 293 causes the flow control members 258, 260, 262, 264 and 291 to operate between an open and closed position to restrict fluid flow through the respective passageways or systems.

In another example, the two-port bleed air system 230 of the illustrated example may employ a sensor 298b downstream from precooler outlet 250 to sense or detect the temperature of the bleed air prior to the system 234. The sensor 298b sends a signal corresponding to the temperature of the bleed air at the precooler outlet 250 to the control system 293. The control system 293 determines if the temperature value at the precooler outlet 250 is at or within a threshold value or range. For example, if the control system 293 determines (e.g., via the comparator 296) that the temperature of the bleed air is greater than a threshold temperature value, then the control system 293 instructs the valve controller 297 to command the FAMV 258 to allow more fan air flow into the inlet 254 of the precooler 246. If the temperature of the bleed air at the precooler outlet 250 is less than the threshold value, then the control system 293 commands the valve controller 297 to reduce the amount of fan air flowing to the inlet 254 of the precooler 246. In some examples, the fan air exiting the outlet 256 is dumped overboard. In other examples, the fan air exiting the outlet 256 of the precooler 246 may be routed for use in other systems of the aircraft.

The control system 293 may similarly cause the flow control members 258, 260, 262, 264 and 291 to regulate the flow of fluid through the respective passageways or systems. Additionally or alternatively, the control system 293 may be part of a main control system 299 of the aircraft.

Figure 3:
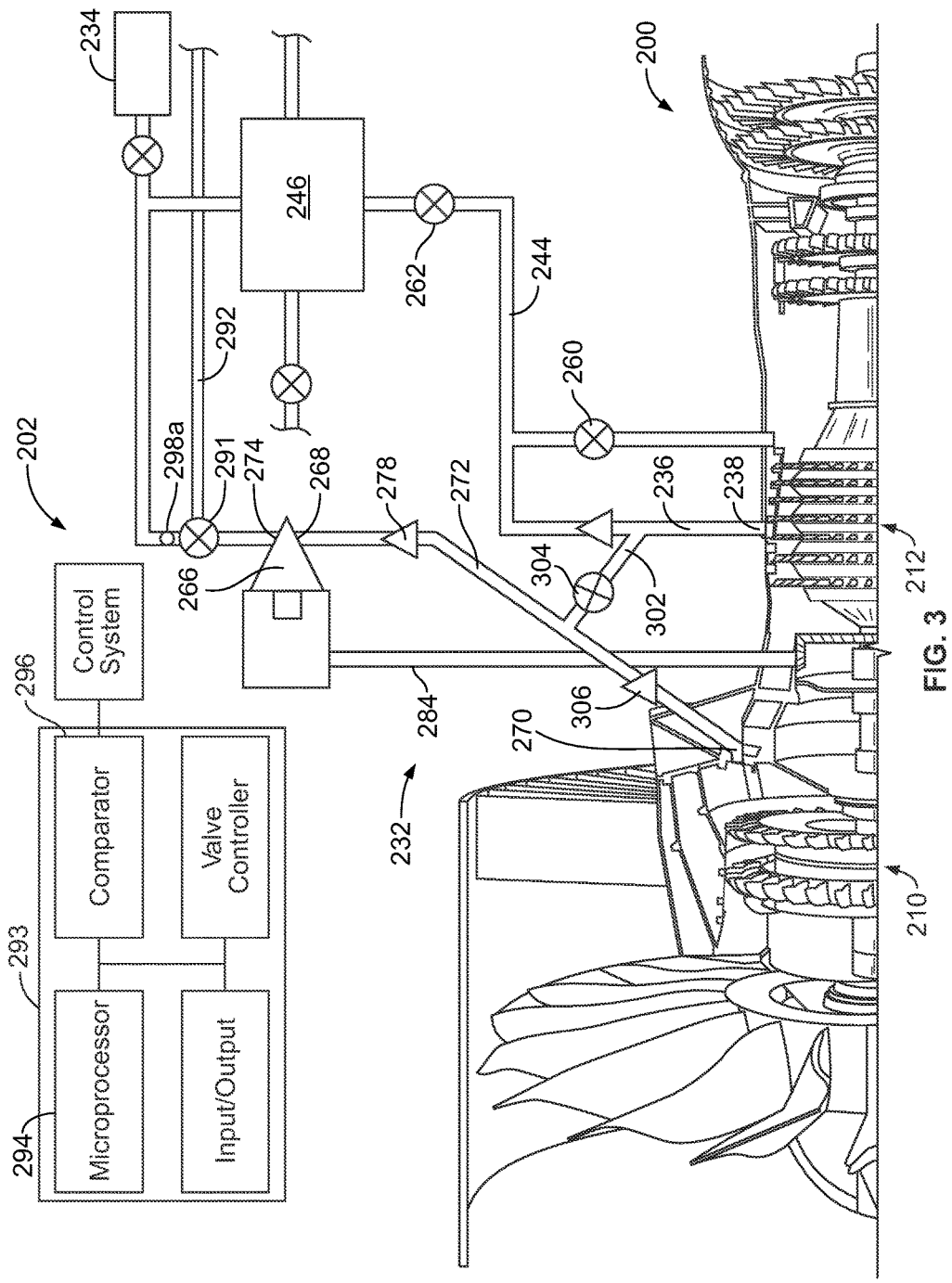
FIG. 3 illustrates another aircraft engine having another example bleed air system disclosed herein.

FIG. 3 illustrates another example bleed air system 300 described herein. Those components of the example bleed air system 300 that are substantially similar or identical to the components of the example bleed air system 202 described above and that have functions substantially similar or identical to the functions of those components will not be described in detail again below. Instead, the interested reader is referred to the above corresponding descriptions. To facilitate this process, the same reference numbers will be used for like structures.

Referring to FIG. 3, the example bleed air system 300 employs an additional bleed air port (e.g., dual-inlet bleed air ports) fluidly coupled to the compressor inlet 268 to provide the compressor 266 with bleed air having a higher pressure than that of the bleed port 270 of the LPC 210. In particular, a passageway or conduit 302 fluidly couples the first bleed air port 238 (e.g., from the passageway 236) and the fluid conduit 272. In other words, the first bleed port 238 of the HPC 212 is fluidly coupled to the compressor inlet 268. In an example operation, if bleed air provided by the bleed air port 270 of the LPC 210 is not high enough to be pressurized by the compressor 266 to meet the demands of the system 234, bleed air having a relatively higher pressure may be taken from the first bleed port 238 of the HPC 212. In this manner, the compressor 266 can supply bleed air to the system 234 during lower thrust operating conditions. As a result, the shaft-driven compressor system 232 enables the bleed air system 300 to supply bleed air to the system 234 during these lower thrust operating conditions while minimizing waste of energy from the engine 200.

Additionally, because the shaft-driven compressor system 232 provides bleed air during more operating conditions, the two-port bleed air system 230 is utilized less (e.g., only during low thrust conditions) and, thus, the precooler 246 may be sized smaller than other precoolers used in other bleed air systems. In other words, the precooler 246 may employ a substantially smaller dimensional envelope and weight.

In the illustrated example shown in FIG. 3, a flow control member 304 is coupled to the passageway 302 and is disposed between the first bleed port 238 and the compressor inlet 268. The flow control member 304 may be configured to regulate the pressure of the bleed air to a pre-set or predetermined pressure value prior to the compressor inlet 268. Additionally, the flow control member 304 may provide fluid flow shut-off (e.g., a PRV, a PRSOV, an SOV, a HPSOV). To prevent back flow pressure to the bleed air port 270, the passageway 272 of the illustrated example employs a flow control member or check valve 306 (e.g., back-flow preventer). The check valve 306 is disposed between the bleed port 270 of the LPC 210 and the junction of the passageways 272, 302 to prevent pressurized airflow toward the bleed air port 270 of the LPC 210 during conditions where there is a higher pressure in the passageway 302 than at the bleed air port 270, thereby preventing the bleed system 300 from causing the LPC 210 to surge or to be damaged.

The sensor 298a may be employed to detect or measure the pressure and/or temperature of the bleed air downstream from the compressor outlet 274 and generate a signal corresponding to the measured pressure and/or temperature to the control system 293. The control system 293 receives the signal from the sensor 298a and may be configured to compare the measured pressure and/or temperature to a threshold value via the comparator 296. For example, if bleed air is supplied to the compressor inlet 268 by the bleed air port 270 of the LPC 210, and the pressure and/or temperature of the bleed air is less than a threshold value, the control system 293 may cause the flow control member 304 to move to an open position to allow bleed air from the first bleed air port 238 of the HPC 212 to flow to the compressor inlet 268. Thus, relatively higher pressure bleed air is provided to the compressor inlet 268 to meet the demands of the system 234. In other words, when the engine is operating at relatively higher thrust conditions (e.g., during take-off and/or cruise), bleed air may be taken from the LPC 210, and when the engine is operating at a relatively lower thrust condition, the flow control member 304 may be opened to direct relatively higher pressure bleed air from the HPC 212 to the compressor inlet 268. Alternatively, the control system 293 may operate the flow control member 304 (e.g., move it to an open position) if the control system 293 receives a signal (e.g., from the main control system 299) indicating that a bleed air system of another engine of the aircraft is not providing adequately pressurized bleed air.

Figure 4:
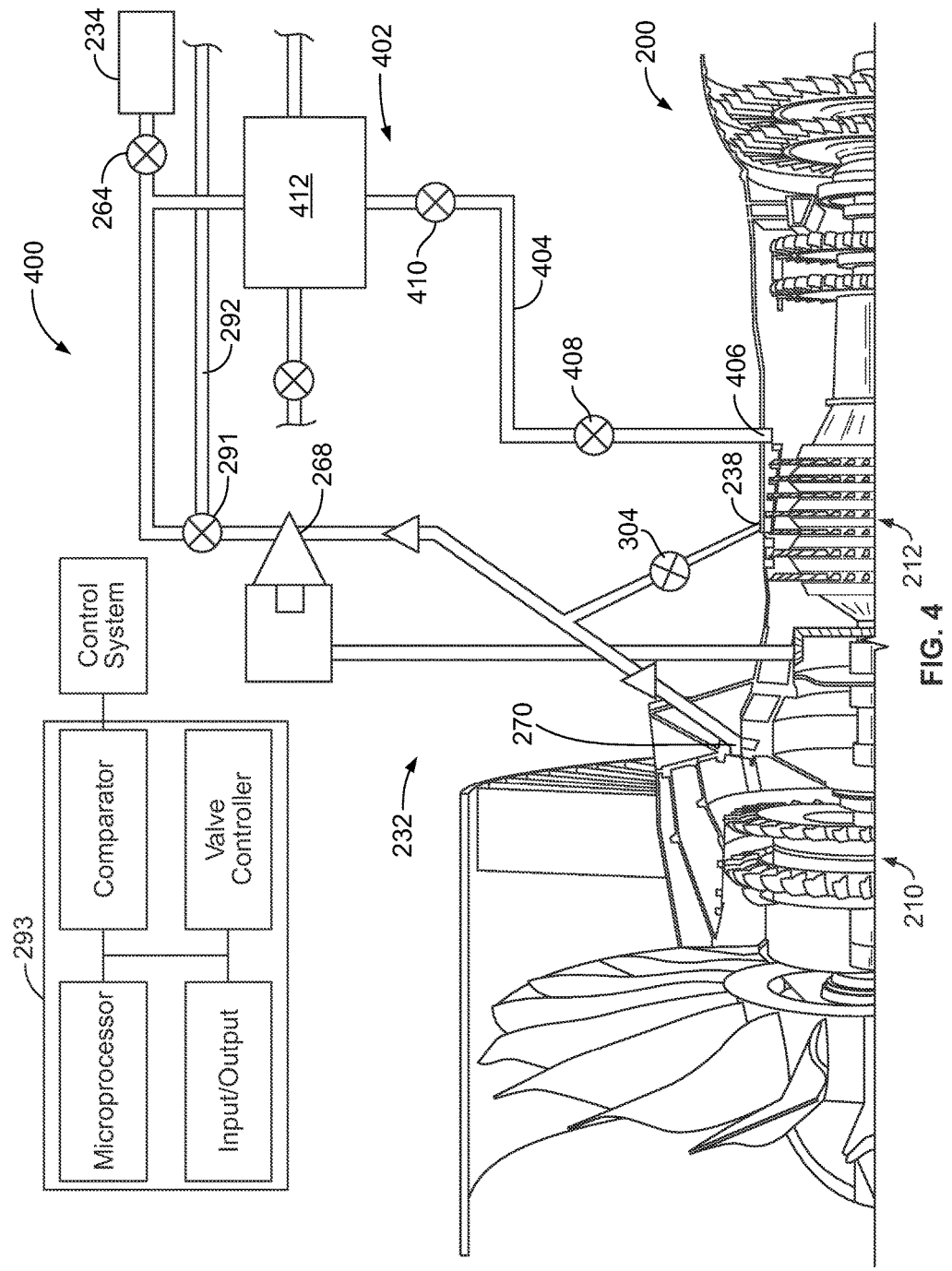
FIG. 4 illustrates another aircraft engine having another example bleed air system disclosed herein.

FIG. 4 illustrates another example bleed air system 400 described herein. Those components of the example bleed air system 400 that are substantially similar or identical to the components of the example bleed air system 202 and/or the example bleed air system 300 described above and that have functions substantially similar or identical to the functions of those components will not be described in detail again below. Instead, the interested reader is referred to the above corresponding descriptions. To facilitate this process, the same reference numbers will be used for like structures.

In the example shown in FIG. 4, the bleed air system 400 includes the shaft-driven compressor system 232 having a duel-inlet bleed air configuration (e.g., similar to the system 300 shown in FIG. 3). In particular, the compressor inlet 268 is fluidly coupled to the bleed port 270 of the LPC 210 and the first bleed port 238 of the HPC 212. Additionally, instead of a two-port bleed air system (e.g., the two-port bleed air system 230 shown in FIG. 2), the example bleed air system 400 illustrated in FIG. 4 includes a single-port bleed air system 402. The single-port bleed air system 402 includes a passageway or conduit 404 that fluidly couples a bleed air port 406 of the HPC 212 to the system 234. A first flow control member 408 and a second flow control member 410 are coupled to the passageway 404 and are disposed between the bleed air port 406 and a precooler 412. The flow control members 408, 410 may be configured to regulate the pressure of the bleed air to a pre-set or predetermined pressure value and/or provide fluid flow shut-off (e.g., a PRV, a PRSOV, an SOV, a HPSOV). In some examples, the first flow control member 408 is a HPSOV and the second flow control member 410 is a PRSOV. In this manner, the first flow control member 408 operates to open and close the passageway 404 to provide bleed air to the system 234 while the second flow control member 410 operates to reduce the pressure of the bleed air prior to the system 234. The two flow control member configuration also provides redundancy in the system if one of the flow control members 408, 410 becomes inoperable (e.g., fails open). The arrangement between the passageway 404 and the precooler 412 may be similar to the passageway 244 and the precooler 246 of the bleed air systems 202 and/or 300 disclosed above.

In the example shown in FIG. 4, the single-port bleed air system 402 may be used to supply bleed air, for example, when the aircraft is operating at low thrust conditions (e.g., idle). In some examples the bleed air provided by the bleed air port 270 of the LPC 210 and the first bleed port 238 of the HPC 212 may be too low to meet the demands of the system 234. In such an instance, the single-port bleed air system 402 is utilized to supply pressurized bleed air to the system 234. Similar to the bleed air systems 200 and 300 disclosed above, the control system 293 may be used to operate the flow control members 258, 264, 291, 304, 408 and 410 of the bleed air system 400.

The example bleed air system 400 of FIG. 4 reduces (e.g., as compared to the bleed air system 200 of FIG. 2) an amount of bleed air that is dumped overboard and/or reduced in temperature and/or pressure during operation. As a result, the efficiency of the engine 200 increases because less energy is used to produce bleed air that is dumped overboard, wasted or lost. Additionally, because the single-port bleed air system 402 may be used in limited operating conditions, e.g., when relatively high pressure is needed, the precooler 412 may be sized smaller than that used in known systems. Having a smaller precooler reduces the amount of weight of the bleed air system 400 and, thus, also increases the efficiency of the aircraft. The system 400 also has fewer components, which reduces the weight and cost of the system 400.

Figure 5:
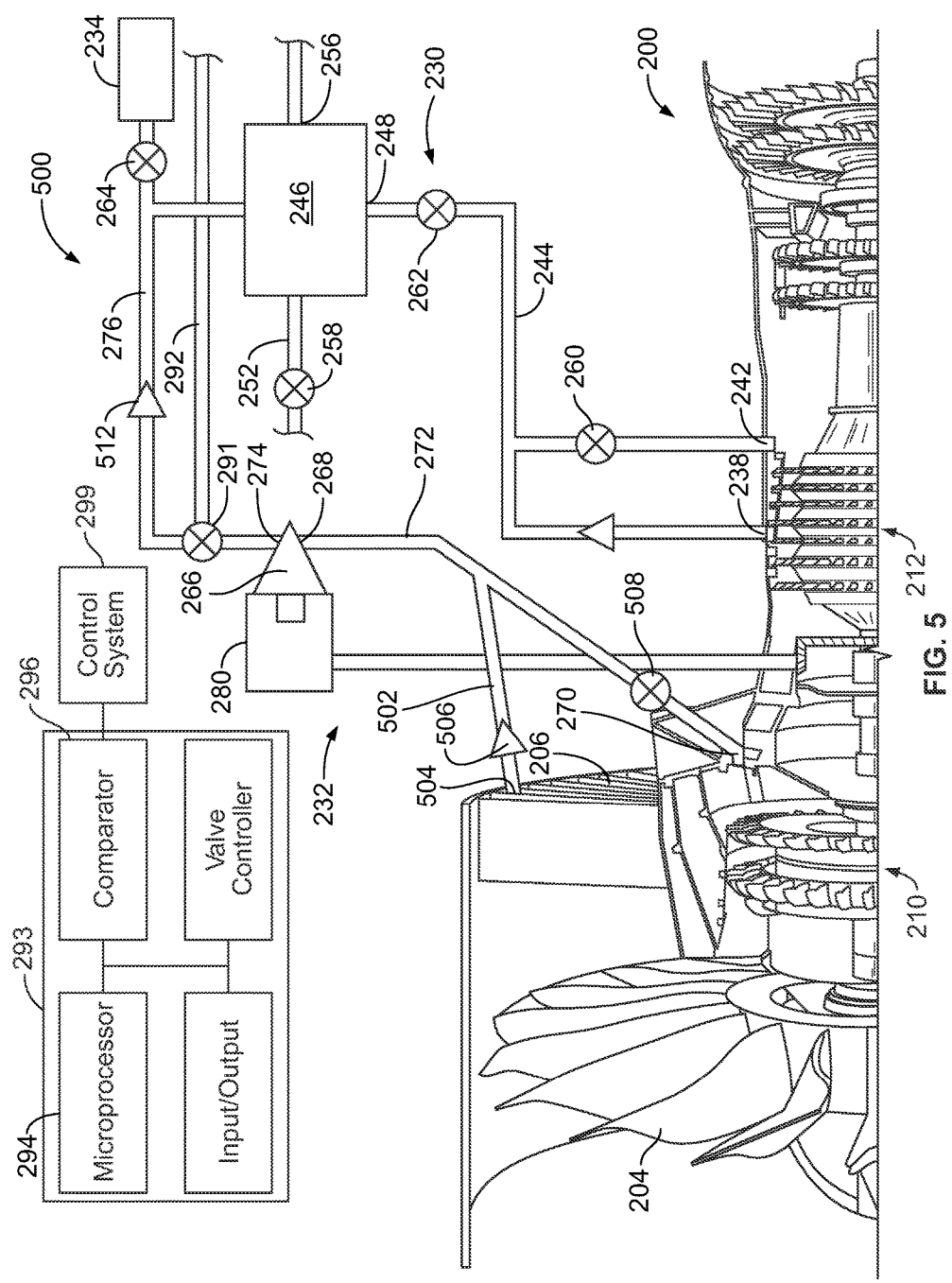
FIG. 5 illustrates another aircraft engine having another example bleed air system disclosed herein.

FIG. 5 illustrates another example bleed air system 500 described herein. Those components of the example bleed air system 500 that are substantially similar or identical to the components of the example bleed air systems 202, 300 and/or 400 described above and that have functions substantially similar or identical to the functions of those components will not be described in detail again below. Instead, the interested reader is referred to the above corresponding descriptions. To facilitate this process, similar reference numbers will be used for like structures.

The example bleed air system 500 of FIG. 5 includes an additional bleed air port to provide pressurized air to the compressor inlet 268 during certain operating conditions. In particular, the example shaft-driven compressor system 232 of the illustrated example is capable of extracting or diverting low pressure bleed air from the fan duct section 206, downstream from the fan 204 (e.g., and fan exit guide vane), and increasing the pressure of the bleed air to meet the demands of the system 234. For example, in certain operating conditions (e.g., during takeoff or climb), the pressure of the bleed air provided by the bleed air port 270 of the LPC 210 may be too high so that, even when the compressor 266 is set to provide a relatively lower boost, the resulting pressure supplied to the system 234 is higher than the pressured demanded by the system 234. In such an instance, instead of wasting energy to reduce the pressure of bleed air that has already been compressed, the shaft-driven compressor system 232 may extract or divert relatively lower pressure bleed air from the fan duct section 206 and increase the pressure to meet the demands of the system 234. As a result, the example system 500 allows the compressor 266 to supply bleed air to the system 234 over a larger portion of the aircraft's mission and, thus, wastes less fuel than other known systems.

In the example shown in FIG. 5, a passageway or conduit 502 fluidly couples a bleed port 504 at the fan duct section 206 to the compressor inlet 268 (e.g., via the passageway 272). When the engine 200 is operating at higher thrust conditions, the bleed port 504 provides bleed air to the compressor inlet 268. If the pressure is too low, relatively higher pressure bleed air may be provided by the bleed port 270 of the LPC 210 (in addition to or as an alternative to the bleed air from the bleed port 504).

To prevent back flow pressure to the bleed port 504, the passageway 502 of the illustrated example employs a flow control member or check valve 506 (e.g., a back-flow preventer, an IPCV). The check valve 506 is disposed between the bleed port 504 of the fan duct section 206 and the junction of the passageways 502, 272 to prevent pressurized airflow toward the bleed air port 504 of the engine 200 during a condition that produces higher pressure in the passageway 502. Further, a flow control member 508 (e.g., a pressure reducing regulator) is coupled to the passageway 272 and disposed between the bleed air port 270 of the LPC 210 and the junction of the passageways 272, 502. For example, the flow control member 508 may be configured to regulate the pressure of the bleed air at the bleed air port 270 to a pre-set or predetermined pressure value prior and/or provide fluid flow shut-off (e.g., a PRV, a PRSOV, an SOV, an HPSOV).

In the example shown, a flow control member or check valve 512 (e.g., a back-flow preventer) is disposed in the passageway 276 between the compressor outlet 274 and the junction of the passages 244, 276. The check valve 512 prevents pressurized airflow toward the compressor outlet 274 during conditions with a higher pressure bleed air in the passageway 244. In some examples, as mentioned above, the compressor 266 may not provide sufficient pressure to meet the demand of system 234, so the two-port system 230 could be used. In such an instance, high pressure bleed air in the passageway 244 would tend to flow toward the compressor 266 through the passageway 276. Therefore, the check valve 512 can be employed to prevent the pressurized airflow toward the compressor outlet 274.

During idle or other low thrust conditions, the engine 200 operates at relatively low speed or low thrust and, thus, relatively low pressures are produced at the bleed ports. As a result, neither of the bleed ports 270, 504 may supply sufficient pressure to meet the demands of the system 234. Therefore, during idle or other low thrust conditions, the two-port bleed air system 230 may be employed to provide bleed air to the system 234. In such an example, the flow control member 508 is closed and bleed air from the bleed air port 504 is supplied to the compressor 256. The flow control member 291 is open and diverts the compressed air (which is relatively cooler) from the compressor outlet 274 to the passageway 292. Additionally, the flow control members 260, 262 are opened to provide relatively higher pressure bleed air from the second bleed air port 242 of the HPC 212 to the system 234. In some examples, the FAMV 258 is also open to operate the precooler 246 and reduce the temperature of the bleed air supplied to system 234.

During takeoff or climb, the engine 200 operates at relatively high speed or high thrust and, thus, relatively higher pressures are produced at the bleed ports. As a result, bleed air provided by bleed port 504 of the intake 506 may be sufficient to meet the demands of the system 234. In such an example, the flow control member 508 is closed and bleed air from the bleed air port 504 is supplied to the compressor 266. The flow control member 291 is opened and compressed bleed air is supplied to the system 234 from the compressor outlet 274. Additionally, at least one of the flow control members 260, 262 of the two-port bleed air system 230 is closed because the shaft-driven compressor system 232 meets the demands of the system 234.

During cruise, the engine 200 operates at a speed or thrust between idle and takeoff. As mentioned above, the shaft-driven compressor system 232 may be sized and geared to provide sufficient bleed air to the system 234 during cruise (e.g., compressing the bleed air by a factor of 2.5). In some examples, the bleed air at the bleed air port 504 may be too low to meet the demands of the system 234. Therefore, in such an example, the flow control member 508 is opened and bleed air from the bleed air port 270 is supplied to the compressor 266. The flow control member 291 is opened and compressed bleed air is supplied to the system 234 from the compressor outlet 274. Additionally, the flow control members 260, 262 of the two-port bleed air system 230 are closed because the shaft-driven compressor system 232 meets the demands of the system 234.

During descent, the engine 200 operates at a relatively low speed and, thus, relatively low pressures are produced at the bleed ports. As a result, neither of the bleed ports 270, 504 may supply sufficient pressure to meet the demands of the system 234. Therefore, during descent, the two-port bleed air system 230 is employed to provide bleed air to the system 234. In such an example, the flow control member 508 is closed and bleed air from the bleed air port 504 is supplied to the compressor 266. The flow control apparatus 291 diverts the compressed air (which is relatively cooler), to the passageway 292. Additionally, the flow control members 260, 262 are opened to provide relatively higher pressure bleed air from the first and/or second bleed ports 238, 242 of the HPC 212 to the system 234. In some examples, the FAMV 252 is also open to operate the precooler 246 and reduce the temperature of the bleed air through the passageway 244.

The combination of the shaft-driven compressor system 232 and the two-port bleed air system 230 provides redundancy in the bleed air system. For example, if one or more of the flow control members or valves becomes inoperable, the other of the two systems may be employed to supply bleed air to the system 234. For example, if the flow control member 508 fails closed during cruise, bleed air may be supplied by the two-port bleed air system 230. Specifically, the bleed air may be provided by the first bleed port 238 of the HPC 212. In such an instance, the flow control member 262 is opened and the flow control member 260 is closed.

Additionally, in the example bleed air systems 202, 300, 400, 500 described above, the control system 293 may operate the various flow control members 258, 260, 262, 264, 291, 304, 408, 410, 508 based on the operating conditions of the engine 200. For example, during operation, different engine speeds and/or different altitudes significantly vary the pressure and/or temperature of the bleed air provided by the LPC 210 and the HPC 212. For example, during high-thrust operation, the pressure of the bleed air provided both the LPC 210 and the HPC 212 is significantly higher than the pressure of the bleed air provided when the engine 200 is at idle. Therefore, the control system 293 may receive indication of the operating parameters or conditions (from the various sensors and/or main control system 299) of the engine 200 and may operate the various flow control members 258, 260, 262, 264, 291, 304, 408, 410, 508 accordingly.

While an example manner of implementing the control system 293 is illustrated in FIGS. 2-5, one or more of the elements, processes and/or devices illustrated in FIGS. 2-5 may be combined, divided, re-arranged, omitted, eliminated and/or implemented in any other way. Further, the example microprocessor 294, the example input/output 295, the example comparator 296, the example valve controller 297 and/or, more generally, the example control systems 293, 299 of FIGS. 2-5 may be implemented by hardware, software, firmware and/or any combination of hardware, software and/or firmware. Thus, for example, any of the example microprocessor 294, the example input/output 295, the example comparator 296, the example valve controller 297 and/or, more generally, the example control systems 293, 299 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, microprocessor 294, the example input/output 295, the example comparator 296, the example valve controller 297 is/are hereby expressly defined to include a tangible computer readable storage device or storage disk such as a memory, a digital versatile disk (DVD), a compact disk (CD), a Blu-ray disk, etc. storing the software and/or firmware. Further still, the example control systems 293, 299 of FIGS. 2-5 may include one or more elements, processes and/or devices in addition to, or instead of, those illustrated in FIGS. 2-5, and/or may include more than one of any or all of the illustrated elements, processes and devices.

Figure 6:
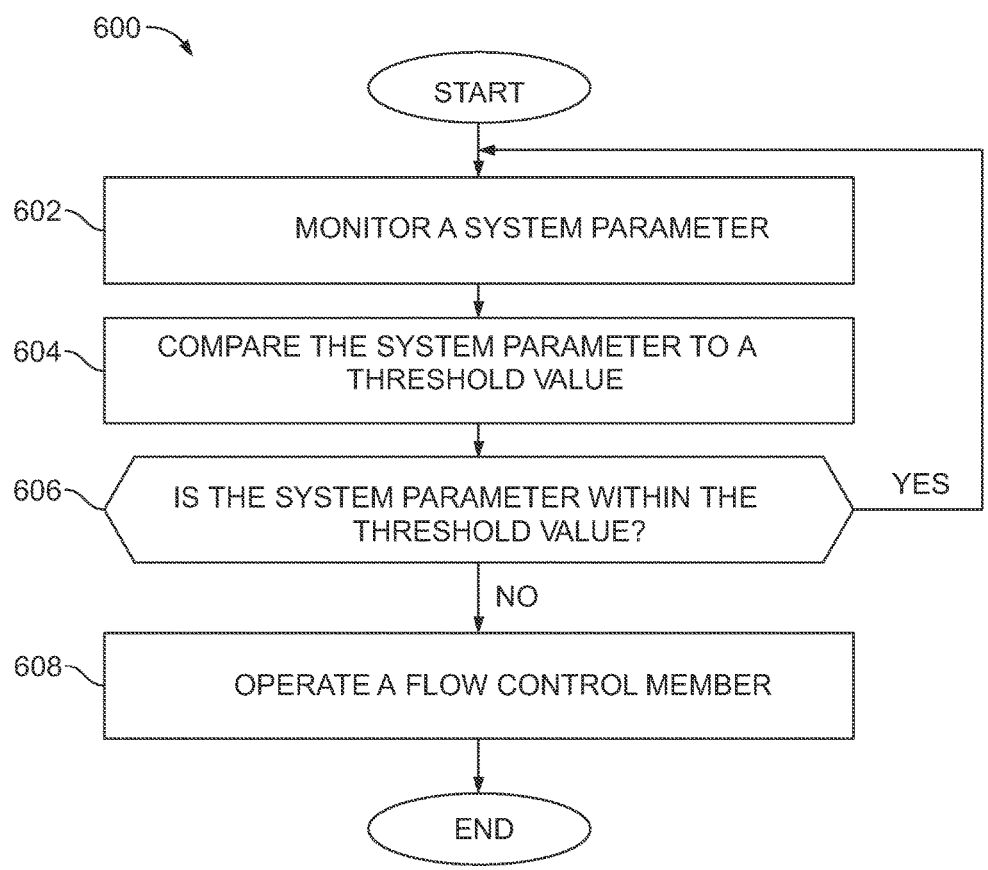
FIG. 6 is a flowchart representative of an example method that may be performed by the example bleed air systems of FIGS. 2-5.
Figure 7:
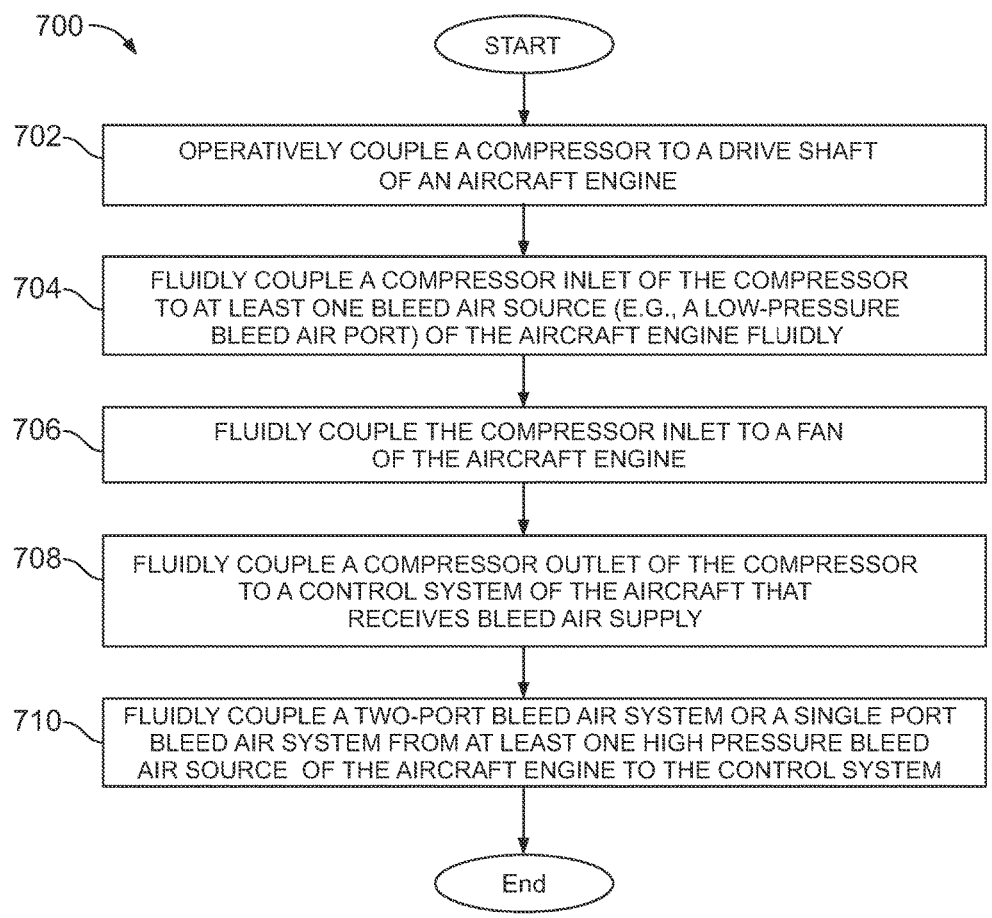
FIG. 7 is a flowchart illustrating a method of implementing the example bleed air systems of FIGS. 2-5.

FIGS. 6 and 7 are flowcharts representative of example methods that may be implemented with an example bleed air system such as, for example, the bleed air systems 202, 300, 400 and/or 500 of FIGS. 2-5 and/or a control system such as the control system 293 of FIGS. 2-5. In this example, the method may be implemented using machine readable instructions that comprise a program for execution by a processor such as the processor 294 shown in the example control system 293 of FIGS. 2-5. The program may be embodied in software stored on a tangible computer readable storage medium such as a CD-ROM, a floppy disk, a hard drive, a digital versatile disk (DVD), a Blu-ray disk, or a memory associated with the processor 294 and/or the control system 293, but the entire program and/or parts thereof could alternatively be executed by a device other than the processor 294 and/or the control system 293 and/or embodied in firmware or dedicated hardware. Further, although the example program is described with reference to the flowcharts illustrated in FIGS. 6 and 7, many other methods of implementing the example microprocessor 294, the example input/output 295, the example comparator 296, the example valve controller 297 and/or, more generally, the example control systems 293, 299 may alternatively be used. For example, the order of execution of the blocks may be changed, and/or some of the blocks described may be changed, eliminated, or combined.

As mentioned above, the example methods of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6 and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

For purposes of discussion, the example method 600 of FIG. 6 is described in connection with the example control system 293 and the example valve controller 297. In this manner, each of the example operations of the example method 600 of FIG. 6 is an example manner of implementing a corresponding one or more operations performed by one or more of the blocks of the example control system 293 or the valve controller 297 of FIGS. 2-5.

Turning in detail to FIG. 6, the control system 293 monitors a system parameter of a bleed air system (block 602). For example, the control system 293 may be configured to monitor one or more system parameters of the example bleed air systems 202, 300, 400 and/or 500 disclosed herein. To monitor a system parameter, the control system 293 receives one or more signals from sensors (e.g., the sensors 298a, 298b) throughout the bleed air system and/or main control system 299. For example, a system parameter may include a pressure of bleed air, a temperature of the bleed air, a speed of the engine 200, an altitude of the aircraft, etc. The control system 293 receives the signals via the input/output module 295.

The control system 293 compares the system parameter to a threshold value (block 604). For example, the control system 293 can compare, via the comparator 296, the pressure and/or temperature of the bleed air received via the sensors to respective threshold values retrieved from a look-up table or storage or with the other values received by the sensors. In some examples, the system parameter and/or the threshold value may be based on other operating conditions of the aircraft.

The control system 293 may then determine if the system parameter measured by, for example, the sensors is within the threshold value (block 606). If the system parameter is within the threshold value, then the control system 293 returns to block 602 to continue monitoring the system parameter. For example, in the bleed air system 300 of FIG. 3, if the pressure of the bleed air at the compressor outlet 274 is substantially equal to the pressure demanded by the system 234, the control system 293 may cause the flow control member 304 to remain in an open position to enable relatively higher pressure bleed air from the first bleed port 238 of the HPC 212 to be supplied to the compressor inlet 268.

If the control system 293 determines that the system parameter is not within the threshold value, then the control system 293 commands the valve controller 296 to operate a flow control member (block 608). For example, in the bleed air system 300 of FIG. 3, if the pressure of the bleed air at the compressor outlet 274 is not substantially equal to (e.g., below) the pressure demanded by the system 234, the control system 293 may cause the flow control members 260, 262 to move to an open position to allow relatively higher pressure bleed air to be supplied to the system 234.

FIG. 7 is a flowchart of an example method 700 of implementing the example bleed air systems 202, 300, 400 and/or 500 in accordance with the teachings of this disclosure. While an example manner of implementing the example bleed air systems, one or more of the blocks and/or processes illustrated in FIG. 7 may be combined, divided, re-arranged, omitted, eliminated and/or implemented in any other way. Further still, the example method of FIG. 7 may include one or more processes and/or blocks in addition to, or instead of, those illustrated in FIG. 7, and/or may include more than one of any or all of the illustrated processes and/or blocks. Further, although the example method 700 is described with reference to the flow chart illustrated in FIG. 7, many other methods of implementing a bleed air system may alternatively be used.

Referring to FIG. 7, a compressor is operatively coupled to a drive shaft of an engine of an aircraft (block 702). In the example bleed air systems 202, 300, 400 and 500 disclosed above, the compressor 266 is operatively coupled to the engine 200 via the drive shaft 284. More specifically, the compressor 266 is operatively coupled to the gearbox 280, which is driven by the drive shaft 284. The drive shaft 284 is operatively coupled to the HPC drive shaft 218. However, in other examples, the drive shaft 284 may be operatively coupled to and drive by the LPC drive shaft 216 or any other drive shaft of the engine 200.

In the example method 700 of FIG. 7, a compressor inlet of the compressor is fluidly coupled to at least one bleed air source of the aircraft engine (block 704). In the example bleed air systems 202, 300, 400 and 500 disclosed above, the compressor inlet 268 is fluidly coupled, via the passageway 272, to the bleed air port 270 of the LPC 210, which provides bleed air having a relatively lower pressure than the HPC 212. In some examples, such as that disclosed in the bleed air systems 300 and 400, the compressor inlet 266 is also fluidly coupled to first bleed air port 238 of the HPC 212. Thus, the example bleed air systems 300 and 400 can extract bleed air from either bleed air ports 238, 270 or both bleed air ports 238, 270. In other examples, the compressor inlet 268 is coupled to more bleed air sources (e.g., five bleed air ports of the engine).

In the example method 700 of FIG. 7, the compressor inlet of the compressor is fluidly coupled to a fan of the aircraft engine (block 706). In the example bleed air system 500 disclosed above, the compressor inlet 268 is fluidly coupled, via the passageway 502, to the bleed air port 504 of the intake section in the fan duct 206. During some example operating conditions (e.g., during take-off or climb), the intake 260 may contain relatively higher pressure bleed air that may be boosted by the compressor 266 to meet the demands of the system 234.

In the example method 700 of FIG. 7, a compressor outlet of the compressor is fluidly coupled to control system of the aircraft that receives bleed air supply (block 708). In the example bleed air systems 202, 300, 400 and 500 disclosed above, the compressor outlet 274 is fluidly coupled, via the passageway 277, to the system 234. The system 234 may include, for example, an ECS, a wing anti-icing system, an engine anti-icing system and/or any other system of the aircraft that utilizes pressurized bleed air.

In the example method 700 of FIG. 7, a two-port bleed air system or a single port bleed air system is fluidly coupled from at least one high-pressure bleed air source of the aircraft engine to the control system (block 710). The two-port bleed air system or the single port bleed air system may be used to provide relatively higher pressure bleed air to the control system and provide redundancy in the overall bleed air system of the aircraft. In the example bleed air systems 202, 300 and 500 disclosed above, the two-port bleed air system 230 fluidly couples, via the passageway 244, the first and second bleed air ports 238, 242 of the HPC 212 to the system 234. The two-port bleed air system 230 may be used alternatively or in addition to the shaft-driven compressor system 232 to provide higher pressure bleed air to the system 234. In the example bleed air system 400 disclosed above, the single port bleed air system 402 fluidly couples, via the passageway 404, the bleed air port 406 of the HPC 212 to the system 234.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
  a shaft-driven compressor system comprising:
    a compressor having a compressor inlet and a compressor outlet, the compressor to be driven by a drive shaft extending from an engine of an aircraft;
    a first passageway to fluidly couple a first bleed air port of a low-pressure compressor of the engine to the compressor inlet;
    a second passageway to fluidly couple the compressor outlet to a system of the aircraft; and
    a first flow control member operable between a first position to enable the shaft-driven compressor system to supply bleed air to the system of the aircraft and a second position to prevent the shaft-driven compressor system from supplying bleed air to the system of the aircraft;
  a two-port bleed air system to fluidly couple a second bleed air port and a third bleed air port of a high-pressure compressor of the engine to the system of the aircraft, the two-port bleed air system including a second flow control member operable between a third position to enable the two-port bleed air system to supply bleed air to the system of the aircraft and a fourth position to prevent the two-port bleed air system from supplying bleed air to the system of the aircraft; and
  a computer control system configured to:
    when the aircraft is operating in a first condition, operate the first flow control member to the first position and operate the second flow control member to the fourth position; and
    when the aircraft is operating in a second condition, operate the first flow control member to the second position and operate the second flow control member to the third position.

2. The apparatus of claim 1, wherein the system of the aircraft is at least one of an environmental control system, a wing anti-icing system or an engine anti-icing system.

3. The apparatus of claim 1 further comprising a third passageway to fluidly couple the second bleed air port to the compressor inlet, the second bleed air port to provide higher pressure bleed air than the first bleed air port.

4. The apparatus of claim 1, wherein the compressor is operatively coupled to a gearbox coupled to the drive shaft.

5. The apparatus of claim 1 further comprising a third passageway to fluidly couple a fan of the engine to the compressor inlet.

6. The apparatus of claim 5, wherein the third passageway couples the fan to the first passageway such that the first passageway supplies air from the fan to the compressor inlet via the first passageway.

7. The apparatus of claim 6, further including a check valve coupled to the third passageway between the fan and a junction of the third passageway and the first passageway, the check valve to prevent higher pressure air in the first passageway from flowing through the third passageway to the fan.

8. The apparatus of claim 7, further including a third flow control member coupled to the first passageway between the first bleed air port and the junction of the third passageway and the first passageway, the third flow control member to at least one of regulate bleed air from the first bleed air port to a pre-set pressure value or provide fluid flow shut-off.

9. The apparatus of claim 1, wherein the compressor of the shaft-driven compressor system comprises at least one of a centrifugal compressor, an axial compressor or a mixed-flow compressor.

10. The apparatus of claim 1, wherein the first flow control member is coupled to the second passageway between the compressor outlet and the system of the aircraft, and wherein, in the first position, the first flow control member enables compressed bleed air to flow from the compressor outlet to the system of the aircraft via the second passageway and, in the second position, the first flow control member directs the compressed bleed air in the second passageway from the compressor outlet to at least one of a turbine of the engine, a casing of the engine, or produce thrust for the aircraft.

11. The apparatus of claim 1, wherein the two-port bleed air system is coupled at a junction to the second passageway upstream of the system of the aircraft, further including a check valve coupled to the second passageway between the compressor outlet and the junction to prevent high pressure air from flowing through the second passageway to the compressor outlet when the aircraft is operating in the second condition.

12. The apparatus of claim 1, wherein the first condition occurs when the aircraft is operating at cruise and the second condition occurs when the aircraft is operating at idle or during a descent.

13. An apparatus comprising:
- a compressor operatively coupled to a drive shaft of an engine of an aircraft, the compressor having an inlet fluidly coupled to a first bleed air port of a low-pressure compressor of the engine and an outlet fluidly coupled via a passageway to a system of the aircraft, a first flow control member coupled to the passageway;
- a bleed air system to fluidly couple a second bleed air port of a high-pressure compressor of the engine to the system of the aircraft, a second flow control member coupled to the bleed air system; and
- a computer control system configured to:
  when the aircraft is operating in a first condition, operate the first flow control member to enable the compressor to provide bleed air to the system of the aircraft and operate the second flow control member to prevent the bleed air system from providing bleed air to the system of the aircraft; and
  when the aircraft is operating in a second condition, operate the first flow control member to prevent the compressor from providing bleed air to the system of the aircraft and operate the second flow control member to enable the bleed air system to provide bleed air to the system of the aircraft.

14. The apparatus of claim 13, wherein the first condition occurs when the aircraft is operating at cruise.

15. The apparatus of claim 14, wherein the second condition occurs when the aircraft is operating at idle or during a descent.

16. The apparatus of claim 13, wherein the bleed air system is a two-port bleed air system.

17. The apparatus of claim 13, wherein the compressor operatively coupled to the drive shaft is further operatively coupled to the engine via bevel gears having a fixed gear ratio.

18. The apparatus of claim 13, wherein the drive shaft is a first drive shaft, and wherein the first drive shaft is operatively coupled to a second drive shaft of the high-pressure compressor of the engine.

19. A method comprising:
- coupling a compressor to a drive shaft of an engine of an aircraft;
- fluidly coupling a compressor inlet of the compressor to a first bleed air port of a low-pressure compressor of the engine;
- fluidly coupling via a passageway a compressor outlet of the compressor to a system of the aircraft that receives bleed air supply, a first flow control member coupled to the passageway;
- fluidly coupling via a bleed air system a second bleed air port and a third bleed air port of a high-pressure compressor of the engine to the system of the aircraft, a second flow control member coupled to the bleed air system; and
- operating the first flow control member and the second flow control member with a computer control system configured to:
  when the aircraft is operating in a first condition, operate the first flow control member to enable the compressor to provide bleed air to the system of the aircraft and operate the second flow control member to prevent the bleed air system from providing bleed air to the system of the aircraft; and
  when the aircraft is operating in a second condition, operate the first flow control member to prevent the compressor from providing bleed air to the system of the aircraft and operate the second flow control member to enable the bleed air system to provide bleed air to the system of the aircraft.

20. The method of claim 19 further comprising fluidly coupling the compressor inlet to the second bleed air port of the high-pressure compressor of the engine.

21. The method of claim 19 further comprising fluidly coupling the compressor inlet to a fan of the engine.

* * * * *